Sept. 6, 1932.  E. H. PECKINPAUGH  1,876,342
ARTIFICIAL BAIT
Filed Oct. 30, 1928

INVENTOR
E.H. Peckinpaugh,
BY

ATTORNEYS

Patented Sept. 6, 1932

1,876,342

UNITED STATES PATENT OFFICE

ERNEST HILORY PECKINPAUGH, OF CHATTANOOGA, TENNESSEE

ARTIFICIAL BAIT

Application filed October 30, 1928. Serial No. 316,013.

This invention relates to artificial bait and, among other objects, aims to provide an improved floating fly-rod lure associated with a fish hook having provisions to prevent the hook from being caught in weeds and the like.

In the accompanying drawing.

Figure 1:
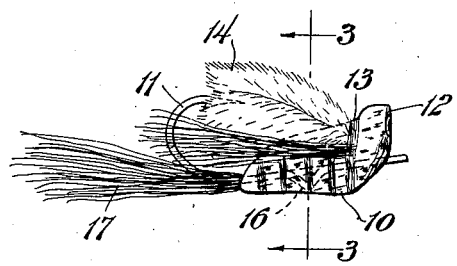
Fig. 1 is a side elevation showing one embodiment of the invention.

Referring particularly to the embodiment of the invention shown in the drawing, the floating lure is in the form of an artificial fly or insect, in the present instance emulating a locust having a rearwardly tapered buoyant body 10 which may be made of cork and supporting a hook 11 with its bill pointing upward so that it will not catch in weeds or the like.

Figure 2:
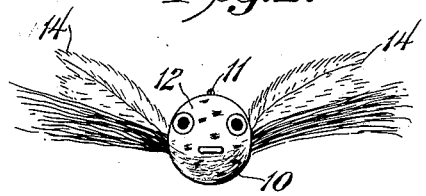
Fig. 2 is a front end view of the lure shown in Fig. 1.
Figure 3:
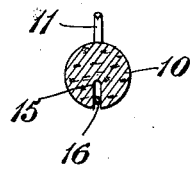
Fig. 3 is a sectional view taken on the line 3—3 of Fig. 1, the dressing being omitted.

Herein, the body portion 10 of the lure has an enlarged head 12 which is curved and inclined rearwardly and downwardly whereby to cause the lure to ride on the surface of the water as the line is retrieved. The head has a reduced neck portion 13 formed by cutting away the upper side of the body and, if desired, tufts 14 of feathers or hair or both emulating wings may be secured thereto, as shown in Fig. 2. Also, the body tapers rearwardly almost to a point under the bill of the hook so as not to prevent the bill from taking hold or catching in the mouth of a fish.

The lower portion of the body 10 is shown as having a shallow longitudinal groove 15 within which the shank of the hook 11 is inserted and the shank is preferably bent or curved as at 16 to prevent the hook from rotating with respect to the body. Thus, the hook lies below the center of gravity of the body and its weight assists in maintaining the body upright on the water.

A tuft of hair or feathers 17 is secured to the shank at the rear end of the body to constitute the tail of the insect and to conceal the bill of the hook so that it cannot be seen from below.

The body, after the hook and tufts have been secured by small twine or the like, is ornamented and made water-proof by the application of suitable paints or pigments and one or more coats of shellac or the like. Also, eyes may be painted or otherwise produced on the front end of the body.

The described fly rod lure is well adapted for fishing among weeds and other obstructions. The center of gravity of the body is such that it always maintains the bill of the hook upright and thus prevents it catching in the weeds. Further, the lure very closely emulates a bug floating on the surface of the water and attracts game fish.

Obviously, the present invention is not restricted to the particular embodiment thereof herein shown and described.

What I claim is:—

1. In combination with a fish hook, an artificial floating insect having an elongated and rearwardly tapered body portion presenting a shallow, longitudinal slot in its lower side within which the shank of the hook is non-rotatably secured with the bill pointing upwardly; a head on the body having a flat vertical face portion above the eye of the hook, a rearwardly inclined face portion below the eye of the hook and a reduced neck portion.

2. In combination with a fish hook, an artificial floating bait having an elongated buoyant body portion secured on the bottom side to the shank with the bill of the hook above the rear end of the body; said body having an enlarged head portion and tapering substantially to a point at the rear end so as not to interfere with the hook and the weight of the hook serving to maintain the body upright on the water; said head having a rearwardly and downwardly inclined face portion to ride on the surface of the water.

In testimony, that I claim the foregoing as my own, I have hereto affixed my signature.

ERNEST H. PECKINPAUGH.